(12) United States Patent
Matsumoto

(10) Patent No.: US 10,986,305 B2
(45) Date of Patent: Apr. 20, 2021

(54) IMAGE MANAGEMENT DEVICE, IMAGE MANAGEMENT METHOD, PROGRAM, AND RECORDING MEDIUM

(71) Applicant: FUJIFILM Corporation, Tokyo (JP)

(72) Inventor: Tetsuya Matsumoto, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/546,063

(22) Filed: Aug. 20, 2019

(65) Prior Publication Data

US 2020/0099885 A1 Mar. 26, 2020

(30) Foreign Application Priority Data

Sep. 26, 2018 (JP) .............................. JP2018-180719

(51) Int. Cl.

| | |
|---|---|
| *H04N 5/93* | (2006.01) |
| *G11B 27/00* | (2006.01) |
| *H04N 5/00* | (2011.01) |
| *H04N 5/765* | (2006.01) |
| *G06T 5/50* | (2006.01) |
| *G06T 7/00* | (2017.01) |
| *H04N 5/85* | (2006.01) |
| *H04N 5/76* | (2006.01) |
| *G06F 16/00* | (2019.01) |

(52) U.S. Cl.
CPC ............. *H04N 5/765* (2013.01); *G06T 5/50* (2013.01); *G06T 7/0002* (2013.01); *H04N 5/85* (2013.01)

(58) Field of Classification Search
USPC .......................... 386/278, 283, 239, 248, 257
See application file for complete search history.

(56) References Cited

U.S. PATENT DOCUMENTS

| | | | | |
|---|---|---|---|---|
| 8,385,950 | B1* | 2/2013 | Wagner | H04L 67/325 |
| | | | | 455/466 |
| 8,750,683 | B2* | 6/2014 | Koreeda | G11B 20/10527 |
| | | | | 386/252 |
| 2017/0040003 | A1* | 2/2017 | Takenouchi | G09G 5/00 |
| 2017/0364675 | A1* | 12/2017 | Vilke | H04L 9/3226 |

FOREIGN PATENT DOCUMENTS

JP 2013-235335 A 11/2013

* cited by examiner

*Primary Examiner* — Daquan Zhao
(74) *Attorney, Agent, or Firm* — Studebaker & Brackett PC

(57) ABSTRACT

An account association unit associates the user account of a service user with the user account of a service provider in a case where the service user starts using a service provided by the service provider. An analysis unit sets, as a target image, an image, which is stored after the user account of the service user is associated with the user account of the service provider, among images stored in the image storage unit for the user account of the service provider, and analyzes an object shown in the target image. An image transmission unit transmits the target image to the image storage unit for the user account of the service user at a preset time point for image transmission in a case where the object relating to the service user is shown in the target image.

15 Claims, 8 Drawing Sheets

FIG. 7
| SERVICE ROVIDER | SERVICE USER | USAGE PERIOD |
|---|---|---|
| SCHOOL U | STUDENT S | APRIL 1, 2017 TO MARCH 31, 2021 |
| SCHOOL V | STUDENT T | APRIL 1, 2018 TO MARCH 31, 2022 |
| ⋮ | ⋮ | ⋮ |
| PRESCHOOL A | PRESCHOOL CHILDREN X | JANUARY 4, 2017 TO APRIL 1, 2020 |
| PRESCHOOL B | PRESCHOOL CHILDREN Y | APRIL 3, 2018 TO APRIL 1, 2021 |
TB1
FIG. 8
| STUDENT IN AFFILIATION | FACE IMAGE INFORMATION |
|---|---|
| STUDENT S | 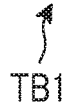 |
| STUDENT T |  |
| ⋮ | ⋮ |
| STUDENT Q | 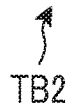 |
TB2

| USER ACCOUNT | IMAGE | AUTHORITY |
|---|---|---|
| STUDENT S | IMAGE Ps1 | FULL PERMISSION |
| | IMAGE Ps2 | FULL PERMISSION |
| | IMAGE Pu3 | LIMITED |
| | ⋮ | ⋮ |
| ⋮ | ⋮ | ⋮ |
| STUDENT U | IMAGE Pu1 | FULL PERMISSION |
| | IMAGE Pu2 | FULL PERMISSION |
| | IMAGE Pu3 | FULL PERMISSION |
| | IMAGE Pu4 | FULL PERMISSION |
| | IMAGE Pu5 | FULL PERMISSION |
| | ⋮ | ⋮ |

TB3

IMAGE MANAGEMENT DEVICE, IMAGE MANAGEMENT METHOD, PROGRAM, AND RECORDING MEDIUM

CROSS-REFERENCE TO RELATED APPLICATIONS

The present application claims priority under 35 U.S.C. § 119 to Japanese Patent Application No. 2018-180719, filed on Sep. 26, 2018. The above application(s) is hereby expressly incorporated by reference, in its entirety, into the present application.

BACKGROUND OF THE INVENTION

1. Field of the Invention

The present invention relates to an image management device, an image management method, a program, and a recording medium capable of storing an image for each user account and using an image of a service user, which is stored under the user account of a service provider, through the user account of the service user.

2. Description of the Related Art

In a case where an individual user manages images of himself or herself and images taken by the user, generally the images are stored on a personal computer owned by the individual user, a smartphone, a recording medium such as an optical disc, or are posted on a social network service (SNS). However, in a case where the images are stored in a plurality of devices, image management becomes difficult because the storage locations of the images are scattered. Therefore, in recent years, an image management device (specifically, a server computer or the like) for centrally managing the images has been developed.

According to the above-mentioned image management device, for example, it is possible to centrally manage the images by uploading all the images to be managed to the image management device. In the above-mentioned image management devices, there are devices capable of setting sharing of the uploaded images with other users (that is, permission of image browsing to other users). With such an image management device, in a case where a certain user uploads an image, it is possible to allow a plurality of other users to browse the image set for sharing. Describing a specific example, a service provider (for example, a school or the like) uploads images of service users (for example, students attending the school or the like and their parents or the like) with own account, and performs setting for sharing the images. In such a manner, it is possible to show the service user himself the image of the service user uploaded by the service provider.

Examples of the image management device capable of setting of image sharing include an apparatus described in JP2013-235335A (denoted as "cloud" in JP2013-235335A). The device described in JP2013-235335A is a cloud that stores information (information such as an image) uploaded from a communication terminal and downloads the stored information to the communication terminal. This cloud corresponds to each user of the communication terminal, and includes personal files, shared folders, and sharing units. The personal files are uploaded from each user. The shared folders store organization files which are shared by members belonging to a predetermined organization and uploaded from the respective members. The sharing unit shares the personal files and the organization files between the personal folders and the shared folders. According to the apparatus described in JP2013-235335A configured as described above, it becomes possible to share the uploaded files among a plurality of users, specifically between users belonging to the same organization.

SUMMARY OF THE INVENTION

However, in the image management device described in JP2013-235335A, the image, which is set for sharing, may be deleted from the shared folder or the image, which has been permitted to be browsed, may not be browsed due to situations of various places. In such a case, it is no longer possible to browse an image that has been deleted or disabled. Further, for example, in the specific example described in "the Related Art", in a case where a service user finishes using the service provided by a service provider (for example, in a case where the student has graduated from school, or the like), the service user's authority for browsing the image stored under the account of the service provider may be lost. In such a case, among the images stored under the account of the service provider, for example, an image, in which the service user is shown, is thereafter unable to be viewed. As a result, it becomes difficult to utilize the image after using the service, for example, creation of an album (photo collection) on which the image is posted.

Due to the above-mentioned situations, the image management device is required to have a function of enabling the service user to utilize the image relating to the service user even after using the service among the images stored under the account of the service provider.

Then, the present invention is made in view of the situations, and has the following object to be achieved.

Specifically, the present invention solves the problems of the above-mentioned prior art, and provides an image management device, an image management method, a program that causes a computer to execute the image management method, and a recording medium that records the program capable of allowing a service user to utilize an image relating to the service user, among images stored under an account of a service provider, even after using the service.

In order to achieve the above object, according to an aspect of the present invention, there is provided an image management device comprising: an account storage unit that stores user accounts; an image storage unit that is provided for each of the user accounts; an account association unit that associates the user account of a service user with the user account of a service provider in a case where the service user starts using a service provided by the service provider; an analysis unit that sets, as a target image, an image, which is stored after the user account of the service user is associated with the user account of the service provider, among images stored in the image storage unit for the user account of the service provider, and analyzes an object shown in the target image; and an image transmission unit that transmits the target image to the image storage unit for the user account of the service user at a preset time point for image transmission in a case where the object relating to the service user is shown in the target image.

In the image management device configured as described above, among the images stored in the image storage unit for the user account of the service provider, an image, in which an object relating to the service user (hereinafter referred to as "an image relating to the service user") is shown, is transmitted to the image storage unit for the user account of the service user. With such a configuration, it is possible for the service user to utilize the image relating to the service user stored under the user account of the service provider even after using the service.

Here, it is more preferable that the above image management device further comprises an image deletion unit that deletes the target image, which is transmitted to the image storage unit for the user account of the service user, among the images stored in the image storage unit for the user account of the service provider, from the image storage unit for the user account of the service provider in a case where the service user finishes using the service.

In such a case, by deleting the image transmitted to the image storage unit for the user account of the service user from the image storage unit for the user account, it becomes possible to reduce the usage capacity of the image storage unit for the user account of the service provider.

In the above-mentioned image management device, the time point for image transmission may be set after the service user finishes using the service.

In such a case, it is possible for the service user to utilize the image relating to the service user stored under the user account of the service provider even after using the service. Further, since the image relating to the service user is stored under the user account of the service provider during the service usage period, it is possible for the service provider side to utilize the image.

In the above-mentioned image management device, in a case where a new image is stored in the image storage unit for the user account of the service provider, the analysis unit may analyze an object shown in the target image by using the new image as the target image. In addition, in a case where the object relating to the service user is shown in the new image as the target image, the image transmission unit may transmit the new image to the image storage unit for the user account of the service user.

In such a case, each time an image relating to the service provider is newly stored under the user account of the service provider, it is possible to transmit the image to the image storage unit for the user account of the service user.

In the above-mentioned image management device, it is more preferable that among the images stored in the image storage unit for the user account of the service provider, the target image is an image stored after an individual who is the service user belongs to a group which is the service provider in order to use the service.

In such a case, when the image of the individual belonging to the group is stored under the user account of the group, it is possible to transmit the image (personal image) to the image storage unit for the user account of the individual.

In the above-mentioned image management device, it is more preferable that in a case where the object shown in the target image is the service user, the image transmission unit transmits the target image to the image storage unit for the user account of the service user at the time point for the image transmission.

In such a case, it is possible for the service user to utilize the image in which the service user is shown, among the images stored under the user account of the service provider, even after using the service.

The above-mentioned image management device further comprises an authority setting unit that sets an authority for handling images for each user account. It is more preferable that in a case where the image transmission unit transmits the target image to the image storage unit for the user account of the service user, the authority setting unit permits reading of the target image as the authority, and sets a limited authority for inhibiting copying of the target image to an external device for the user account of the service user.

In such a case, regarding the image transmitted to the image storage unit for the user account of the service user, the service user is able to order browsing and printing and the like, while data copying or the like is restricted.

In the above-mentioned image management device, it is preferable that the authority setting unit sets a full permission authority for fully permitting handling including copying to an external device and reading, as the authority for the image stored in the image storage unit for the user account of the service provider, for the user account of the service provider. In addition, it is preferable that the authority of the target image for the user account of the service provider remains as the full permission authority at a time point after the image transmission unit transmits the target image to the image storage unit for the user account of the service user.

In such a case, even after the image relating to the service user is transmitted to the image storage unit for the user account of the service user, the service provider is permitted to perform full handling such as browsing and copying on the images. As a result, even after the image relating to the service user is transmitted to the image storage unit for the user account of the service user, it becomes possible for the service provider side to utilize the image (for example, order photo printing).

In the above-mentioned image management device, in a case where the image deletion unit deletes the target image from the image storage unit for the user account of the service provider, the authority setting unit may reset the authority of the target image for the user account of the service user, to the full permission authority from the limited authority.

In such a case, as the image relating to the service user is deleted from the image storage unit for the user account of the service provider, the full permission authority for the image relating to the service user shifts to the service user. Thereafter, the service user is able to freely use the image.

In the above-mentioned image management device, in a case where the image deletion unit deletes the target image from the image storage unit for the user account of the service provider, the authority setting unit may reset the authority of the target image for the user account of the service provider, to the limited authority from the full permission authority.

In such a case, as the full permission authority for the image relating to the service user shifts to the service user, the service provider's authority for the image changes to the limited authority. Thereafter, the service user is able to prevent the service provider side from utilizing the image relating to the service user.

It is more preferable that the above-mentioned image management device further comprises an album creation unit that creates an album unique to an individual user by using an image stored in the image storage unit for the user account of the individual user.

In such a case, it is possible to create an album unique to the individual user, by using the image managed under the user account of the individual user. In such a configuration, the effect of the present invention (by which the service user is able to utilize the image relating to the service user even after using the service) becomes more significant.

In the above-mentioned image management device, it is more preferable that the album creation unit creates the album by using an image in which the individual user is shown among the images stored in the image storage unit for the user account of the individual user.

In such a case, in order to create an album by using an image in which the individual user is shown, for example, the individual user is able to retrospectively recall old events from the image of the album.

In the above-mentioned image management device, it is more preferable that the album creation unit creates the album by using an image in which the individual user and a participant of an event relating to the individual user are shown among the images stored in the image storage unit for the user account of the individual user.

In such a case, it is possible to create the album by using the image in which the individual user and participants of the event relating to the individual user are shown. Thereby, for example, the individual users and participants of the event are able to retrospectively recall old events by looking at the album.

The above-mentioned image management device further comprises an evaluation value calculation unit that calculates an evaluation value for an image used to create the album. It is preferable that in a case of calculating the evaluation value, the evaluation value calculation unit adds points in accordance with an object shown in the image used to create the album.

In such a case, in a case where the album is created, an evaluation value is calculated for the image used for album creation in accordance with the object shown in the image. Thereby, for example, an image with a high evaluation value can be preferentially used for album creation. As a result, it is possible to create an album having high utility value for individual users.

In order to achieve the above object, there is provided an image management method comprising: associating a user account of a service user with a user account of a service provider in a case where the service user starts using a service provided by the service provider, through an account association unit; setting, as a target image, an image, which is stored after the user account of the service user is associated with the user account of the service provider, among images stored in the image storage unit for the user account of the service provider, and analyzes an object shown in the target image, through an analysis unit; and transmitting the target image to the image storage unit for the user account of the service user at a preset time point for image transmission in a case where the object relating to the service user is shown in the target image, through an image transmission unit.

It is more preferable that the above-mentioned image management method further comprises creating an album unique to an individual user by using an image stored in the image storage unit for the user account of the individual user through an album creation unit.

The present invention also provides a program for causing a computer to execute the above-mentioned image management method.

The present invention also provides a computer readable recording medium that records a program for causing a computer to execute the above-mentioned image management method.

According to an aspect of the present invention, there is provided an image management device comprising: a processor and a storage device. The storage device is composed of: an account storage unit which stores user accounts; and an image storage unit which is provided for each of the user accounts. The processor is configured to associate the user account of a service user with the user account of a service provider in a case where the service user starts using a service provided by the service provider, set, as a target image, an image, which is stored after the user account of the service user is associated with the user account of the service provider, among images stored in the image storage unit for the user account of the service provider, and analyzes an object shown in the target image, and transmit the target image to the image storage unit for the user account of the service user at a preset time point for image transmission in a case where the object relating to the service user is shown in the target image.

According to the present invention, an image management device, an image management method, a program for causing a computer to execute the image management method, and a recording medium recording the program, which enable a service user to utilize an image relating to the service user stored under a user account of the service provider even after using the service.

BRIEF DESCRIPTION OF THE DRAWINGS

FIG. 7 is a diagram illustrating a service management table.

FIG. 8 is a diagram illustrating a face matching table.

DESCRIPTION OF THE PREFERRED EMBODIMENTS

Hereinafter, an image management device, an image management method, a program, and a recording medium according to the present invention will be described in detail based on preferred embodiments (hereinafter, the present embodiments) illustrated in the attached drawings. The embodiments described below are merely examples for the purpose of describing the present invention in an easy-to-understand manner, and do not limit the present invention. That is, the present invention is not limited to the following embodiments, and various improvements or modifications can be made without departing from the scope of the present invention. Further, it is apparent that the present invention includes the equivalents thereof.

Furthermore, in the present specification, the "image" is defined as image data including, for example, lossless compression image data such as joint photographic experts group (JPEG) format, lossless compression image data such as graphics interchange format (GIF) or portable network graphics (PNG) image data, and the like.

Overview of Image Management Device

Figure 1:
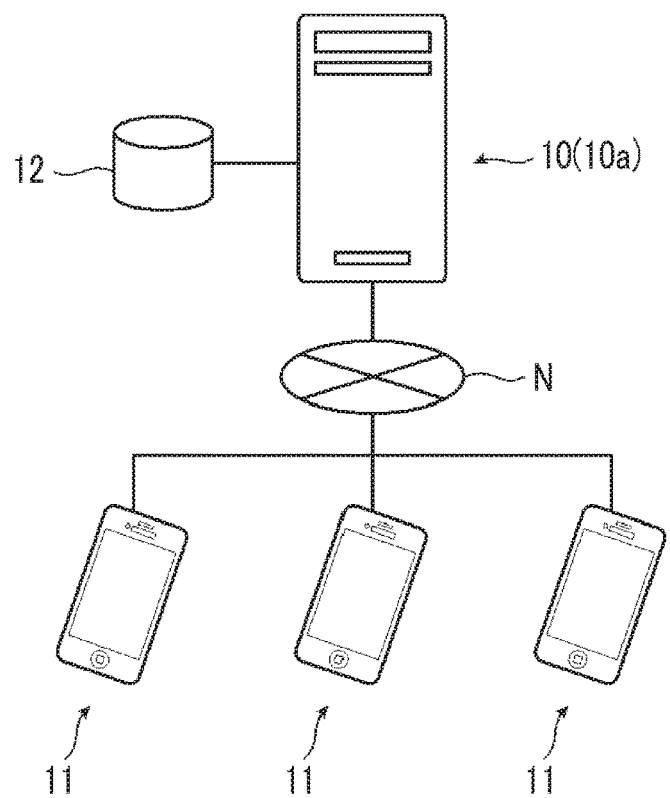
FIG. 1 is a diagram illustrating an image management device and related devices.

An overview of an image management device (hereinafter, an image management device 10) according to the present embodiment will be described with reference to FIG. 1. FIG. 1 is a diagram illustrating the image management device 10 and related devices. Although the number of user terminals 11 connected to the image management device 10 through a network N is three in FIG. 1 for convenience of illustration, the number of user terminals 11 may be any number.

As illustrated in FIG. 1, the image management device 10 is communicably connected to at least one or more user terminals 11 through the network N such as an Internet line or a mobile communication line. The image management device 10 is a computer as a server, and the user terminal 11 is a terminal as a client.

In an overview of the functions of the image management device 10, the image management device 10 receives an image input (upload) from the user terminal 11 and accumulates the input image in the database 12. That is, the main function of the image management device 10 is an aggregation function that collects images of each user and centrally manages the images.

Specifically, a user who is the owner of the user terminal 11 inputs an image to the image management device 10 through the user terminal 11. Here, examples of the image to be input (hereinafter, also referred to as an input image) include an image, which is captured by the user with an imaging apparatus such as a camera mounted on the user terminal 11, and an image which is captured by the user with another imaging apparatus and loaded to the user terminal 11. Further, the examples of the input image include an image which is converted into digital data by reading an old picture (analog picture) by a scanner or the like.

A user account is assigned to the user, and the user logs in to the image management device 10 with the user account of the user in a case where the image is input to the image management device 10. The image management device 10 stores user accounts, and specifies the user account that is the transmission source of the input image in a case of receiving the image input from the user terminal 11. Then, the image management device 10 accumulates the input image in the database 12 for each user account.

Figure 2:
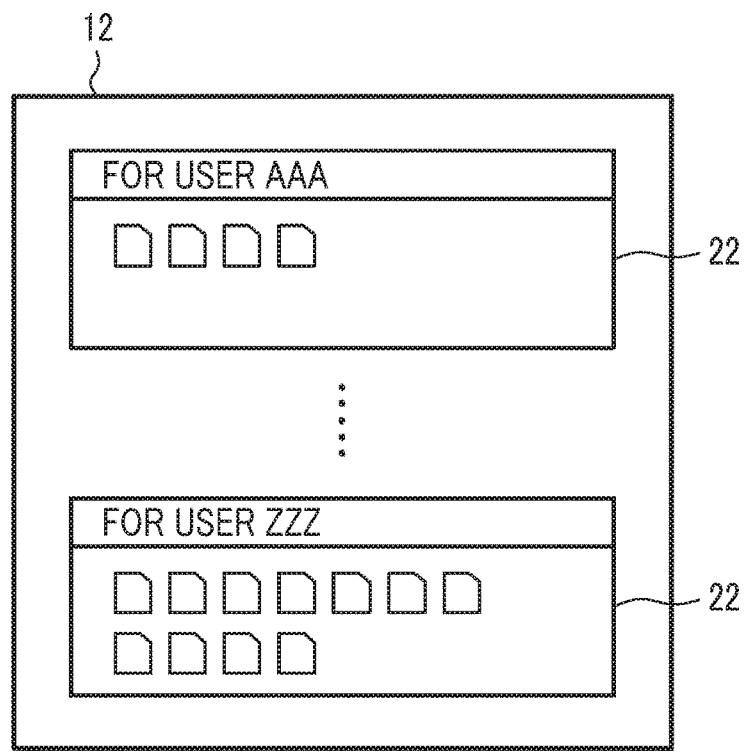
FIG. 2 is a diagram illustrating an image storage unit provided for each user account.

More specifically, as illustrated in FIG. 2, the database 12 is provided with an image storage unit 22 (for example, a folder for image storage) for each user account. In a case of receiving the image input, the image management device 10 accumulates the input image in the image storage unit 22 for the user account specified at the time of receiving the image input. FIG. 2 is a diagram illustrating the image storage unit 22 provided for each user account.

Each user is able to browse the image by displaying the image stored in the image storage unit 22 for the user account of the user on the user terminal 11 while logging in to the image management device 10.

In addition, each user is able to perform setting for sharing the image, which is stored in the image storage unit 22 for the user account of the user, with other users (that is, setting of browsing permission for other users). The image, which is set to be shared, can be displayed on the user terminals 11 of the other users who are subjected to the sharing. That is, the other users are able to browse the image, which is set to be shared, with the user accounts of the users.

It should be noted that the sharing setting may be performed individually for each of the images stored under the user account of the user, or sharing setting may be performed collectively for all the images stored under the user account of the user.

Further, the other users who are subjected to the sharing may be designated by the user who performs the sharing setting, or may be automatically determined in accordance with the contents of the image which is set to be shared. In particular, in the latter case, it is preferable to determine whether the image is appropriate for the sharing setting (browsing permission) in consideration of an object or the like shown in the image and the connection and the relationship between the user who performs the sharing setting and the other users who are subjected to the sharing (for example, mere acquaintance, friend, lover, family, or the like).

Figure 3:
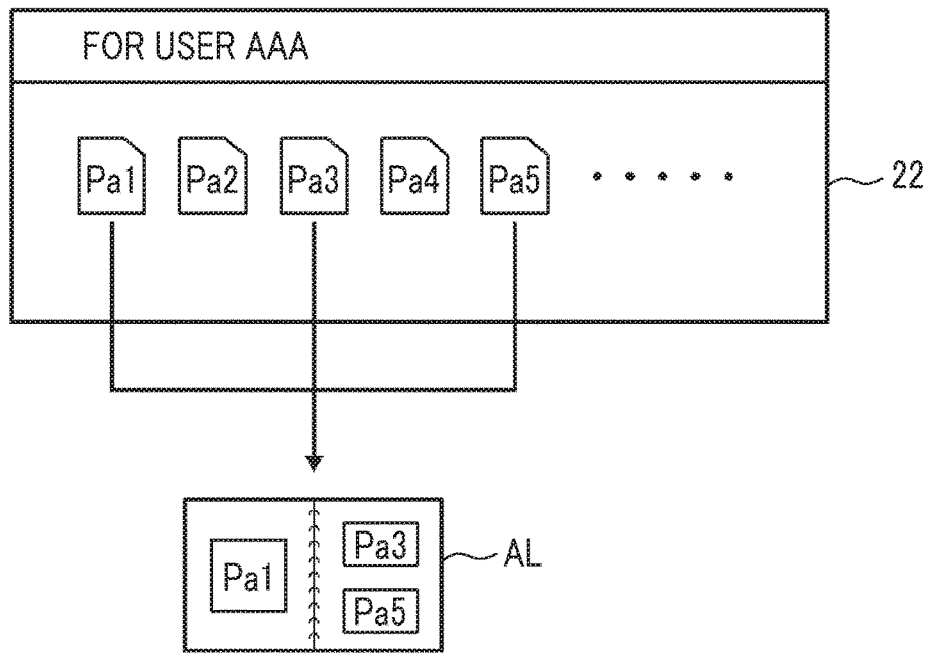
FIG. 3 is an image diagram of album creation.

In the present embodiment, in a case where the user is an individual user, the image management device 10 is able to create an album unique to the individual user by using the image stored under the user account of the individual user. Such a function will be specifically described with reference to FIG. 3. FIG. 3 is an image diagram of album creation.

For example, in a case where the user AAA who is an individual user requests album creation from his/her user terminal 11, the image management device 10 receives the album creation request and accesses the image storage unit 22 for the user account of the user AAA. Thereafter, the image management device 10 extracts an image or the like, in which the user AAA is shown, as the image to be used for album creation among the images Pa1, Pa2, Pa3, Pa4, Pa5, . . . stored in the image storage unit 22 described above. Then, as illustrated in FIG. 3, the image management device 10 creates an album AL unique to the user AAA by using the extracted images (Pa1, Pa3, and Pa5 in FIG. 3). The user AAA is able to, for example, recall past events (such as exercise event, entrance ceremony, graduation ceremony, wedding ceremony, and golden wedding ceremony) or looks back on his/her own life by watching the above-mentioned album AL.

The album AL may be a collection as a booklet formed by attaching a printed matter of images onto predetermined sheets, or may be electronic data (for example, digital photo book) in which a plurality of image data pieces are organized and edited as one data. In the embodiments described below, an album AL in electronic data format is created.

Further, the request for creating the album AL unique to the individual user is not limited to the case where the individual user makes the request. The related parties of the individual user (such as relatives and friends) or businessmen (such as wedding vendors and funeral businessmen) holding events for individual users may make an album creation request.

Figure 4:
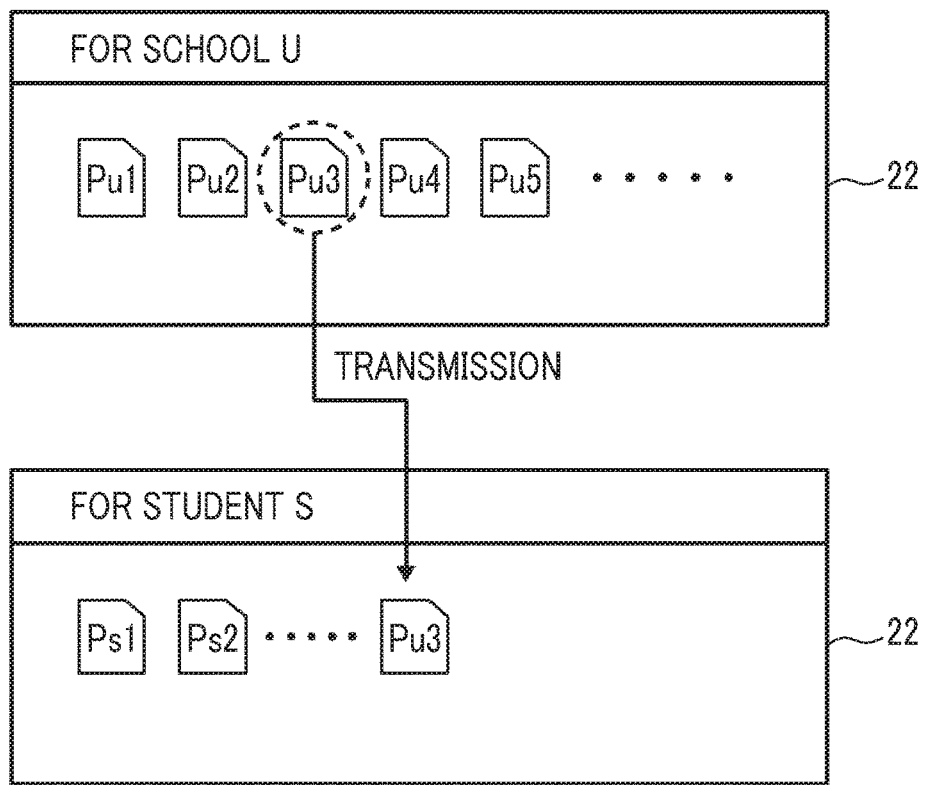
FIG. 4 is an image diagram of image transmission.

In a state where the image management device 10 manages images stored under the user account of each of the service user and the service provider, in a case where the predetermined condition is satisfied, the image management device 10 provides the images relating to the service user to the service user among the images stored under the user account of the service provider. Such a function will be specifically described with reference to FIG. 4. FIG. 4 is an image diagram of image transmission.

For example, it is assumed that a student S and a school U each own a user account, and an image is stored in the image storage unit 22 for each user account. In such a case, in a period in which the student S is at the school U (in other words, during a period in which the educational service provided by the school U is used), the student S is able to browse images Pu1, Pu2, Pu3, Pu4, Pu5, . . . stored in the storage unit 22 for the user account of the school U with the user account of the user.

It is assumed that the images stored in the image storage unit 22 for the user account of the school U include an image (the image Pu3 in FIG. 4) in which the student S is shown. Further, in a case where the student S graduates from the school U (in other words, in a case where the use of the educational service provided by the school U ends), as illustrated in FIG. 4, the image management device 10 transmits the image Pu3, in which the student S is shown, among the images stored in the image storage unit 22 for the user account of the school U, to the image storage unit 22 for the user account of the student S. Thus, the student S is able to browse the image Pu3 even after graduating from the school U, and is able to use the image Pu3 for album creation.

In the above case, the student S corresponds to the service user, and the school U corresponds to the service provider. Here, the school U means an organization (group) such as teachers and employees working at the school U. Further, the service provider may be a person who provides a benefit to the service user, and the service user may be a person who enjoys the benefit. That is, the combination of the service provider and the service user is not limited to the school and the students. For example, the competition committee member of a marathon race event or the like may be set as the service provider and the tournament participant (runner) may be set as the service user. Other examples include hospitals and patients, and in more specific cases, obstetrics and gynecology hospitals may be set as the service provider, and puerperds and newborns may be set as the service users. In such a case, the image to be transmitted (that is, the image stored under the hospital user account and eventually transmitted to the user account of the puerperd) includes an ultrasound echo image of a fetus captured before parturition and the like.

Although the functions of the image management device 10 have been described above, the image management device 10 may further be provided with a function other than the functions described above. For example, in a case where a certain individual user (hereinafter referred to as the target user) dies or in a case where the target user makes a request for the image before his/her death, the image management device 10 may be provided with a function of re-storing the image stored under the user account of the target user under user accounts such as relatives of the target user or handing over the user account of the target user itself to a relative or the like.

Further, even in a case where the image management device 10 further has a function of organizing the images stored under the user account of the target user after the death of the target user and handing over the images sorted under the predetermined sorting rule to the bereaved.

In addition, in a case of monitoring a behavior pattern of each user relating to image management (such as the image input frequency, the image browsing frequency, and the contents of the response to the setting for image sharing) and detecting that the behavior pattern is different from the normal pattern, the image management device 10 may have a function of determining that the user is in an abnormal state, that is, an abnormality detection function.

In the present embodiment, the image management device 10 centrally manages the image management information (specifically, history information indicates when and by which user account the image has been input, viewed, copied, transmitted, or the like) for the purpose of preventing unauthorized copying of the image. However, the present invention is not limited to this. For example, block chain technology (distributed ledger technology) may be used, and specifically, image management may be performed by storing the above-mentioned image management information under each of a plurality of user accounts and performing cooperation between the user accounts. Even in such a case, it is possible to prevent unauthorized image copying.

Configuration of Image Management Device and User Terminal

Next, each of the configuration of the image management device 10 and the configuration of the user terminal 11 will be described.

The image management device 10 is constituted by a computer (hereinafter, a computer 10a) as described above. The computer 10a is provided with a processor, and the processor reads a program for image management (hereinafter referred to as an image management program) and performs various kinds of data processing to exhibit the function as the image management device 10. The image management processing program is stored in the main storage of the image management device 10 together with data and the like necessary for executing the image management program. Examples of the main storage device include a read only memory (ROM), a random access memory (RAM), a dynamic random access memory (DRAM), a static random access memory (SRAM), and the like, but the main storage device are not limited to the memories.

The image management device 10 further comprises a database 12. The database 12 stores an image input from each user terminal 11 for each user (strictly, for each user account). More specifically, the database 12 comprises the image storage unit 22 provided for each user account, and stores an image, which is input under each user account, in the image storage unit 22 corresponding to the user account.

The database 12 stores the user account of each user. Further, the database 12 stores a service management table TB1 to be described later, a face matching table TB2, and an authority management table TB3. As described above, the database 12 storing various kinds of data is constituted by, for example, a storage device of the image management device 10, strictly speaking, an external storage device. Examples of the external storage device include optical discs such as a compact disc read only memory (CD-ROM), a digital versatile disc (DVD), and a Blu-ray disc (registered trademark), a flexible disc, a hard disc drive, a flash memory, a magnetic tape, and the like but the external storage device is not limited thereto. Further, the image management device 10 may be constituted by another computer communicably connected to the computer 10a together with the computer 10a. In such a case, the database 12 may be constructed by another computer described above.

The user terminal 11 is constituted by, for example, a personal computer (PC), a tablet terminal, a smartphone, a mobile phone, or the like. The user terminal 11 includes: an input device such as a keyboard, a mouse and a touch panel; a display device such as a liquid crystal display and a touch panel; and a communication device such as a communication interface provided to communicate with the image management device 10. In addition, the user terminal 11 includes a data processing unit (user terminal side processor) that executes data processing and the like in response to the user's input operation.

Detailed Configuration of Image Management Device

Figure 5:
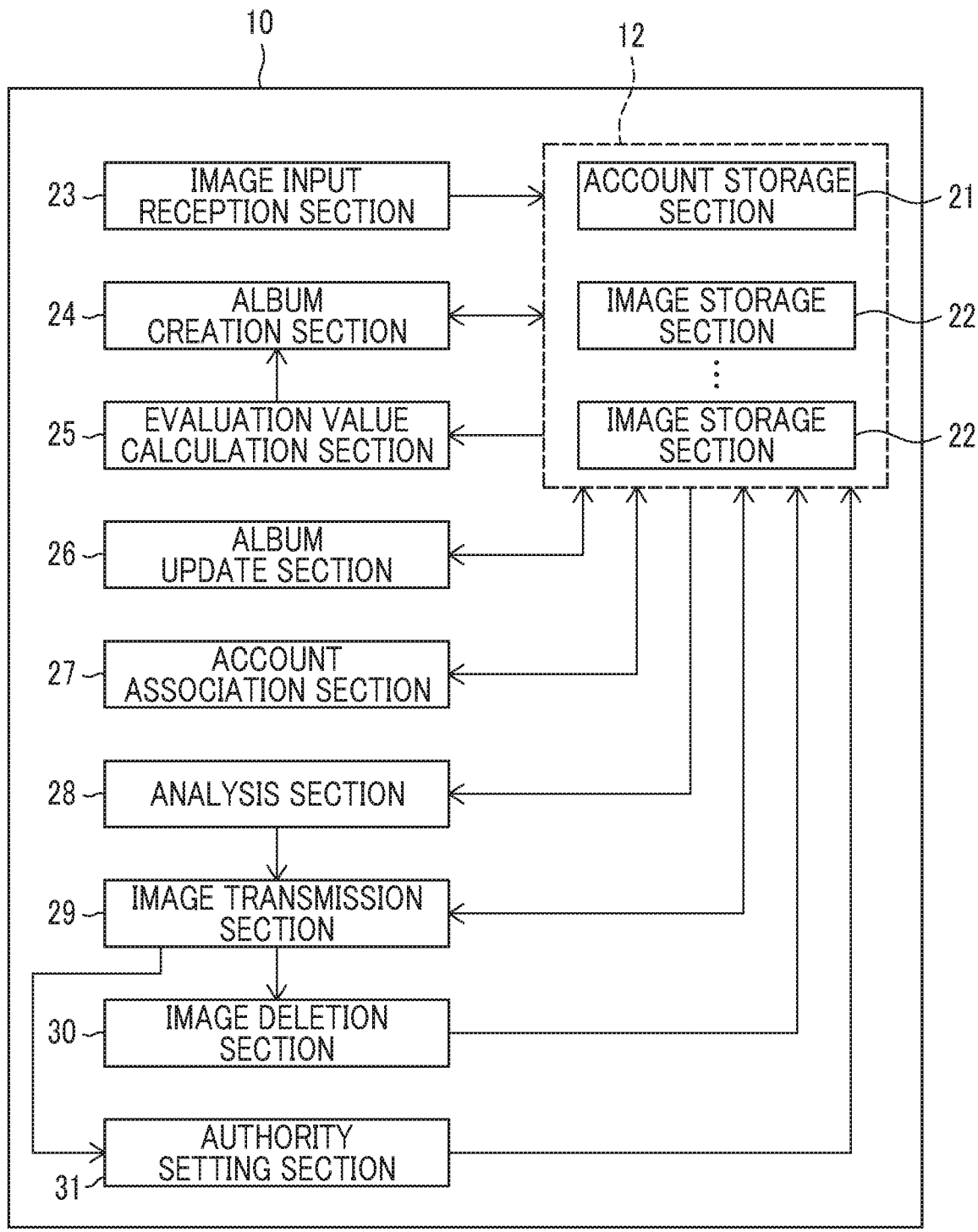
FIG. 5 is a block diagram illustrating a plurality of processing units included in the image management device.

Next, the detailed configuration of the image management device 10 will be described with reference to FIG. 5. FIG. 5 is a block diagram illustrating a plurality of processing units included in the image management device 10.

As illustrated in FIG. 5, the image management device 10 includes an account storage unit 21, an image storage unit 22, an image input reception unit 23, an album creation unit 24, an evaluation value calculation unit 25, an album update unit 26, an account association unit 27, an analysis unit 28, an image transmission unit 29, an image deletion unit 30, and an authority setting unit 31. Among the processing units, the processing units excluding the account storage unit 21 and the image storage unit 22 are implemented by cooperating hardware devices such as the computer 10a used as the image management device 10 with an image management program as software.

On the other hand, the account storage unit 21 and the image storage unit 22 are constituted by the database 12 described above, and specifically, are constituted by a storage device (strictly, an external storage device) of the image management device 10.

In addition to the configuration of each processing unit, in the present invention, the hardware configuration of each processing unit of the image management device 10 (specifically, the image input reception unit 23, the album creation unit 24, the evaluation value calculation unit 25, the album update unit 26, the account association unit 27, the analysis unit 28, the image transmission unit 29, the image deletion unit 30, and the authority setting unit 31) may be a dedicated hardware, or may be various processors or computers to execute a program.

The various processors includes: a central processing unit (CPU) which is a general-purpose processor that executes software (program) and functions as each processing unit; a programmable logic device (PLD) which is a processor capable of changing the circuit configuration after manufacturing a field programmable gate array (FPGA) and the like; a dedicated electric circuit which is a processor having a circuit configuration specially designed to execute specific processing such as application specific integrated circuit (ASIC); and the like.

Further, one processing unit may be constituted by one of these various processors, or a combination of two or more processors of the same or different types. For example, one processing unit may be constituted by a combination of a plurality of FPGAs, or a combination of an FPGA and a CPU. Furthermore, the plurality of processing units may be constituted by one of various processors, or may be constituted by one processor formed by organizing two or more of the plurality of processing units.

For example, as typified by computers such as servers and clients, there is a configuration in which one processor is constituted by a combination of one or more CPUs and software and this processor functions as a plurality of processing units. The present embodiment corresponds to this configuration.

Further, as typified by a system on chip (SoC) or the like, there is a configuration using a processor that realizes functions of the whole system including a plurality of processing units by one integrated circuit (IC) chip.

Furthermore, the hardware configuration of the various processors is, more specifically, an electric circuit (circuitry) in which circuit elements such as semiconductor elements are combined.

Among the processing units of the image management device 10 described above, the account storage unit 21 and the image storage unit 22 are involved in the overall functions of the image management device 10. The image input reception unit 23 is also involved in the function of the image management device 10 for receiving an image input and accumulating an input image. Further, the album creation unit 24, the evaluation value calculation unit 25, and the album update unit 26 are involved in the album creation function of the image management device 10. Furthermore, the account association unit 27, the analysis unit 28, the image transmission unit 29, the image deletion unit 30, and the authority setting unit 31 are involved in the image transmission function and the like of the image management device 10.

Hereinafter, each processing unit of the image management device 10 will be described separately for each function involved.

Account Storage Section and Image Storage Section

The account storage unit 21 stores the user account assigned to each user. Each user logs in to the image management device 10 with the user account of the user, but in this case, the user has to input a user name (ID) and a password for identity authentication. The account storage unit 21 stores the user account of each user in association with information such as a user name (ID) and a password.

In principle, a user corresponding to a user name associated with a user account thereof uses the user account. However, other than that, for example, the user's relatives and the like may use and manage a user account of a minor user or a user account of a user who died.

The image storage unit 22 is provided for each user account. The user account under, which it is possible to browse the images stored in each image storage unit 22, includes: a user account (hereinafter referred to as a principal account) corresponding to each image storage unit 22; an account for which image sharing is set by the principal account; and the like.

Regarding a user account (hereinafter referred to as a group account) in a case where the user is an organization or a group, in a case where the user account of the individual belongs to the organization or the group, while the individual belongs to the organization or the group, it is possible to browse the image stored in the image storage unit 22 corresponding to the group account, and it is possible to order the printing of the image from a printing company through the Internet or the like.

Image Input Reception Section

The image input reception unit 23 receives an image input (upload of an image) performed by each user through the user account of the user. Specifically, each user operates the user terminal 11 to log in to the image management device 10 with the user account of the user. Thereafter, each user selects an image to be input through an image selection screen, which is not illustrated in the drawing, displayed on the display of the user terminal 11, and performs an operation for uploading the selected image (for example, an operation for tapping a push button for uploading). In response to this situation as a trigger, an image selected by the user is input (uploaded) from the user terminal 11 to the image management device 10. The image input is performed in accordance with the above procedure, and the image input reception unit 23 receives the image input through the network N.

The image input reception unit 23 accumulates the input image in the database 12. More specifically, the image input reception unit 23 specifies the user account of the user who is a providing source of the input image from the accompanying information such as the exchangeable image file format (Exif) accompanying the input image. Thereafter, the image input reception unit 23 stores the above-mentioned input image in the image storage unit 22 corresponding to the specified user account.

Album Creation Section, Evaluation Value Calculation Section, and Album Update Section The album creation unit 24 creates the album AL unique to the individual user using the images stored in the image storage unit 22 for the user account of the individual user in response to the request from the individual user.

In the present embodiment, the album creation unit 24 creates the album AL using the image in which the individual user is shown among the images stored in the image storage unit 22 for the user account of the individual user. Describing a specific example, the album creation unit 24 performs analysis for specifying the user by setting an image in which a person is shown as an analysis target among the images stored in the image storage unit 22 for the user account of the user AAA who is an individual user. In this analysis, the album creation unit 24 specifies a person, who is shown in the analysis target image the largest number of times, as the user AAA, and extracts the analysis target image, in which the specified user AAA is shown, as an image for album creation. Then, the album creation unit 24 creates the album AL unique to the user AAA by using the extracted image (that is, the image in which the user AAA is shown).

In the present embodiment, the created album AL unique to the individual user (strictly, electronic data of the album AL) is stored (saved) in the image storage unit 22 for the user account of the individual user. However, the storage destination of the album AL is not particularly limited, and can be freely set.

In the present embodiment, the album creation unit 24 is able to create the album AL by using an image, in which the individual user and the participant of the event relating to the individual user are shown, among the images stored in the image storage unit 22 for the user account of the individual user.

Describing a specific example, it is assumed that the user AAA who is an individual user is dead and the user account of the user AAA is handed over to a relative of the user AAA. The relative of the user AAA is able to request the image management device 10 to create the album AL unique to the user AAA through the inherited user account of the user AAA, and for example, may request the album creation during the funeral of the user AAA. In such a case, the relative of the user AAA transmits an image (hereinafter referred to as a funeral image) captured during the funeral of the user AAA together with the album creation request. In a case where the above-mentioned funeral image is received together with the album creation request, the album creation unit 24 specifies a person (that is, a funeral attendee) shown in the above-mentioned funeral image. Thereafter, the album creation unit 24 extracts an image, in which the user AAA and the specified funeral attendee are shown, from the images stored in the image storage unit 22 for the user account of the user AAA, and creates the album AL by using the extracted image.

Thereby, at the time of funeral of the user AAA, it is possible to create the album AL by organizing images centered on a picture in which the deceased user AAA and the funeral attendees are shown, and it is possible to show the picture to each funeral attendee.

It should be noted that the event relating to the individual user is not limited to the funeral of the individual user, and may be, for example, a wedding ceremony, a birthday party, a reunion, and the like.

The evaluation value calculation unit 25 calculates an evaluation value for the image used to create the album AL. Specifically, in a case of calculating the evaluation value, the evaluation value calculation unit 25 specifies an object shown in the image used to create the album AL, and adds points in accordance with the specified object. More specifically, the evaluation value calculation unit 25 analyzes the image for album creation extracted by the album creation unit 24, that is, the image in which the individual user is shown, and specifies the object shown in the image. Thereafter, the evaluation value calculation unit 25 determines the scene shown in the image from the combination of the objects shown in one image. For example, in the case where the combination of the objects is a combination of "wedding dress", "flower", and "relative", the scene of the image in which the object is shown is determined as "wedding". The evaluation value calculation unit 25 adjusts the evaluation value of the image in accordance with the determined scene of the image.

After the evaluation value calculation unit 25 calculates the evaluation value, the album creation unit 24 creates the album AL by using each image extracted by the album creation unit 24. At this time, the album creation unit 24 creates the album AL on the basis of the evaluation value of each image, and for example, creates an album AL by preferentially using an image having a high evaluation value. In a case where the evaluation value is calculated for the image used for creating the album in such a manner, even for an image which is an old picture and thus has no saturation (such as a black and white image) and an image with low image quality, it is possible to set a high evaluation value for the image of the event important to the individual user by adding points thereto. As a result, it is possible to evaluate the image as an image appropriate for creating the album AL unique to the individual user.

The album update unit 26 updates the album AL by reviewing the album AL created by the album creation unit 24 at a predetermined time. Specifically, the evaluation value calculation unit 25 checks the images stored in the image storage unit 22 for the user account of the target user periodically (for example, for each year) after the album AL of the target user is completed. The reason for this is that the number of images stored in the image storage unit 22 for the user account of the target user is likely to increase after the creation of the album and, in such a case, it is necessary to review the images used for the creation of the album.

Then, the album update unit 26 selects an image to be added to or replaced from the checked images, and updates the album AL by using the selected image (specifically, recreates the album AL). Thereby, even in a case where the number of images increases with the passage of life, the album AL can be appropriately updated (recreated) in accordance therewith. The album update time is not particularly limited, but, for example, the album update may be performed at the time of homecoming or at the time of an important event such as a silver wedding or a golden wedding.

Figure 6:
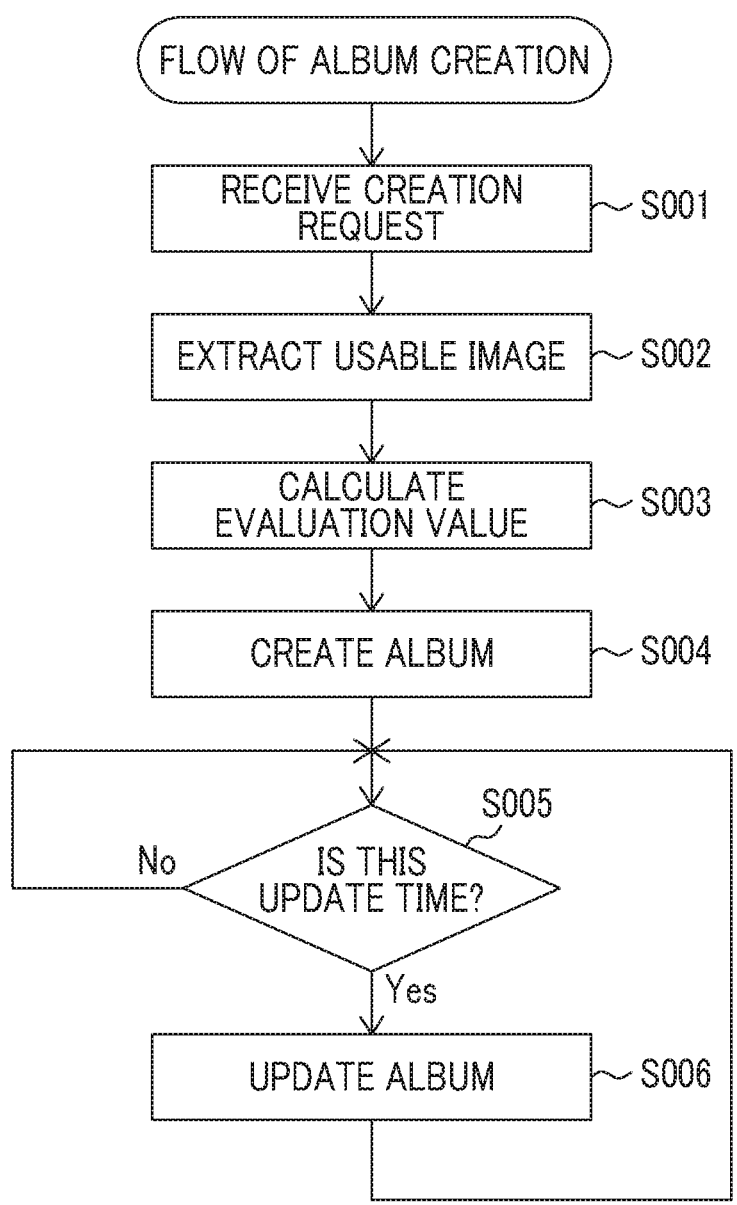
FIG. 6 is a diagram illustrating a flow of album creation.

Next, as an operation example of the album creation unit 24, the evaluation value calculation unit 25, and the album update unit 26, a flow of the album creation illustrated in FIG. 6 will be described. FIG. 6 is a diagram illustrating the flow of the album creation. In the description of the flow of the album creation described below, as a specific example, a case where a user AAA who is an individual user requests creation of an album for the user AAA will be described.

At the start of the flow of the album creation, the user AAA operates the user terminal 11 of the user AAA so as to request the album creation. Thereby, data of the album creation request is transmitted from the user terminal 11 of the user AAA to the image management device 10. Then, in a case where the album creation unit 24 of the image management device 10 receives the data of the album creation request through the network N, the flow of the album creation is started in response to the data as a trigger (S001).

In a case where the flow of the album creation is started, first, the album creation unit 24 extracts an image (hereinafter referred to as a usable image) to be used for album creation from the images stored in the image storage unit 22 for the user account of the user AAA (S002). More specifically, the album creation unit 24 extracts an image, in which the user AAA is shown, as the usable image.

Thereafter, the evaluation value calculation unit 25 of the image management device 10 calculates an evaluation value for each of the usable images extracted by the album creation unit 24 (S003).

After the above steps, the album creation unit 24 creates the album AL unique to the user AAA by using each usable image in accordance with the evaluation value of each usable image (S004). The data of the created album AL is stored in the image storage unit 22 for the user account of the user AAA.

After completion of the album, in a case where a predetermined time has passed (in other words, when the update time has come), the album update unit 26 of the image management device 10 checks the images stored in the image storage unit 22 for the user account of the user AAA, and updates the created album AL unique to the user AAA as necessary (S005). Hereinafter, each time the update time comes, it is determined whether or not the update of the album AL is necessary. In a case where the update is necessary, the album update unit 26 updates the album AL.

Account Association Section, Analysis Section, Image Transmission Section, Image Deletion Section and Authority Setting Section The account association unit 27, the analysis unit 28, the image transmission unit 29, the image deletion unit 30, and the authority setting unit 31 are involved in image transmission from the user account of the service provider to the user account of the service user. Here, the image transmission means transmission of images (that is, data of images) stored in the image storage unit 22 for the user account of the service provider to the image storage unit 22 for the user account of the service user.

In the following description, a case where the service provider is the school U and the service user is the student S will be appropriately described as a specific example. However, as described above, the combination of the service provider and the service user is not particularly limited, and it is apparent that the contents described below are applicable to combinations other than school and students.

In a case where the service user starts using the service provided by the service provider, the account association unit 27 associates the user account of the service user with the user account of the service provider. For example, in a case where the student S belongs to the school U (specifically, the student S enters the school U), the account association unit 27 associates the user account of the student S with the user account of the school U.

Specifically, in a case where the student S belongs to the school U, the staff of the school U operates the user terminal 11 of the school U, and the date, at which the student S belongs to the school U, and the related matters are registered in the user terminal 11. The user terminal 11 transmits the registered information (hereinafter referred to as usage registration information) to the image management device 10. In a case of receiving the usage registration information through the network N, the account association unit 27 specifies the service provider (school U), the service user (student S), and a service usage period (attendance period) on the basis of the usage registration information. Then, the account association unit 27 associates the specified three pieces of information with one another, and registers them in the service management table TB1 illustrated in FIG. 7. FIG. 7 is a diagram illustrating the service management table TB1.

The service management table TB1 is data for associating the user account of the service provider and the user account of the service user, and is stored in the database 12 of the image management device 10 as described above. The account association unit 27 registers the service provider and the service user in the service management table TB1 in association with the service usage period as processing of associating the user account of the service provider with the user account of the service user.

The analysis unit 28 analyzes the object shown in the target image among the images stored in the image storage unit 22 for the user account of the service provider. Here, the target image is an image stored after association between the user account of the service user and the user account of the service provider, among the images stored in the image storage unit 22 for the user account of the service provider. Specifically, in the above-mentioned specific example, the image stored after the student S (individual) belongs to the school U (group) corresponds to the target image.

The image analysis performed by the analysis unit 28 will be described in detail. For example, an image of an event held by the school U is stored in the image storage unit 22 for the user account of the school U. This image is provided, for example, to the school U by the photo shooter requested by the school U to take a picture at the above-mentioned event, and is input (uploaded) by the school U to the image management device 10 through the user terminal 11 of the school U. Thereby, the image is stored in the image storage unit 22 for the user account of the school U.

Then, each time a new image is stored in the image storage unit 22 for the user account of the school U, the analysis unit 28 sets the new image as the target image, and analyzes the object shown in the target image. More specifically, the analysis unit 28 determines whether a person is shown as an object in the target image. In a case where a person is shown in the target image, the analysis unit 28 determines whether the person is a student who is in (belongs to) the school U by using a face matching technology or the like, and specifies which student is the student being in the school U. At this time, the analysis unit 28 refers to the face matching table TB2 illustrated in FIG. 8. FIG. 8 is a diagram illustrating the face matching table TB2. It should be noted that the face image information illustrated in the drawing is somewhat simplified and illustrated for convenience of illustration.

In the description of the face matching table TB2, the face matching table TB2 is data including face image information or information indicating a face feature amount for each student who is in (belongs to) the school U. As described above, the face matching table TB2 is stored in the database 12 of the image management device 10. The image information or the like of the face recorded in the face matching table TB2 is obtained, for example, by analyzing the image stored in the image storage unit 22 for the user account of each student associated with the user account of the school U. In the description based on the above-mentioned specific example, in a case of acquiring the face image information of the student S, among the images stored in the image storage unit 22 for the user account of the student S, an image in which a person is shown is set as the analysis target image, the face image information of a person, who has been shown the most frequently in the analysis target image, is acquired as the face image information of the student S.

The face matching table TB2 is updated along with the service management table TB1 in a case where the new student belongs to (enters) the school U, and specifically, the above-mentioned face image information of the new student is added to the face matching table TB2.

In a case where the object of the target image analyzed by the analysis unit 28 is an object relating to the service user, the image transmission unit 29 sets the target image to the image storage unit 22 for the user account of the service user at a preset time point of image transmission. Specifically, in the above-mentioned specific example, in a case where the object shown in the target image is the student S, the target image (that is, the image in which the student S is shown) is transmitted to the image storage unit 22 for the user account of the student S at the predetermined time point of image transmission.

More specifically, it is assumed that while the student S is in (belongs to) the school U, the new image is stored in the image storage unit 22 for the user account of the school U. In such a case, as described above, the analysis unit 28 sets the new image as the target image, and analyzes the object shown in the target image. In a case where the student S is shown as an object in the new image described above, the image transmission unit 29 transmits the new image to the image storage unit 22 for the user account of the student S after the analysis performed by the analysis unit 28 is completed.

The transmitted target image is stored in the image storage unit 22 for the user account of the student S. Thereby, the student S is able to utilize the target image (the transmitted image) under the user account of the user, and strictly speaking, the student S is able to handle the target image within the range of the authority to be described later.

In the present embodiment, in a case where the student S is shown in the target image, the target image is transmitted to the image storage unit 22 for the user account of the student S. However, the present invention is not limited to this. An object other than student S (such as a friend frequently shown in the image together with the student S or goods owned by the student S) may be shown as an object relating to the student S in the target image. In this case, the target image may be transmitted to the image storage unit 22 for the user account of the student S.

The image deletion unit 30 deletes the image (target image), which is transmitted by the image transmission unit 29 to the image storage unit 22 for the user account of the service user, among the images stored in the image storage unit 22 for the user account of the service provider, from the image storage unit 22 for the user account of the service provider. Specifically, in the above-mentioned specific example, in a case where the object of the target image analyzed by the analysis unit 28 is the student S, the image transmission unit 29 transmits the target image to the image storage unit 22 for the user account of the student S. Thereafter, in a case where the student S graduates from the school U (in other words, in a case where the use of the service provided by the school U ends), the image deletion unit 30 deletes the transmitted target image (that is, an image in which the student S is shown) from the image storage unit 22 for the user account of the school U.

In the present embodiment, the image transmitted to the image storage unit 22 for the user account of the student S is deleted from the image storage unit 22 for the user account of the school U at the time point at which the student S graduates from the school U. However, the deletion timing of the transmitted image is not particularly limited. For example, the image may be deleted substantially simultaneously with the image transmission, or may be deleted after a certain period of time has elapsed since the student S graduated from the school U.

Figure 9:
FIG. 9 is a diagram illustrating an authority management table.

The authority setting unit 31 sets the authority for handling of the image for each user account. More specifically, the authority for handling is set by the authority setting unit 31 for each of the images stored in the image storage unit 22 for the user account of each user. The authority, which is set for each image, is managed by the authority management table TB3 illustrated in FIG. 9. FIG. 9 is a diagram illustrating the authority management table TB3.

Regarding the authority management table TB3, the authority management table TB3 is data defining the authority of each image stored in the image storage unit 22 for the user account for each user account, and is stored in databases 12 of the image management device 10, as described above.

It should be noted that each time an image is newly stored in the image storage unit 22 for a certain user account, the authority setting unit 31 sets an authority (new authority) for the new image to the user account, and updates the authority management table TB3 so as to add the new authority thereto.

In the present embodiment, as illustrated in FIG. 9, two types of authorities can be set, and the first type of the authorities is full permission authority. The full permission authority is an authority for fully permitting image handling including image reading of the image and the copying of the image to the external device (for example, the user terminal 11). Further, the reading of the image is defined to include handling which is for browsing the image through the user terminal 11 or for asking the vendor to print the image, which is being browsed, through the user terminal 11, in a case where a user logs in to the image management device 10 under the user account of the user using the user terminal 11.

In a case where the user inputs (uploads) an image under the user account of the user, the full permission authority is generally set as the authority for the input image to the user who performs the image input. Here, assuming the above-mentioned specific example, all the images stored in the image storage unit 22 for the user account of the school U are images which are input (uploaded) by the school U under their own user account. Therefore, for each of the images stored in the image storage unit 22 for the user account of the school U, full permission authority is set for the user account of the school U, as illustrated in FIG. 9.

The second type of authority is a limited authority. The limited authority is an authority that inhibits copying of the image to the external device while permitting reading of the image. In the present embodiment, in a case where the image transmission unit 29 transmits the target image to the image storage unit 22 for the user account of the service user, the authority setting unit 31 sets the limited authority as the authority of the target image to the user account of the service user. Here, assuming the above-mentioned specific example, it is assumed that the object of the target image analyzed by the analysis unit 28 is the student S and the target image is transmitted to the image storage unit 22 for the user account of the student S. In such a case, the authority setting unit 31 sets a limited authority as the authority of the target image to the user account of the student S. As a result, the student S is able to browse the target image and make a printing order through the user terminal 11 by logging in to the image management device 10 with the user account of the student S. On the other hand, copying of the target image to the user terminal 11 is limited.

Figure 10:
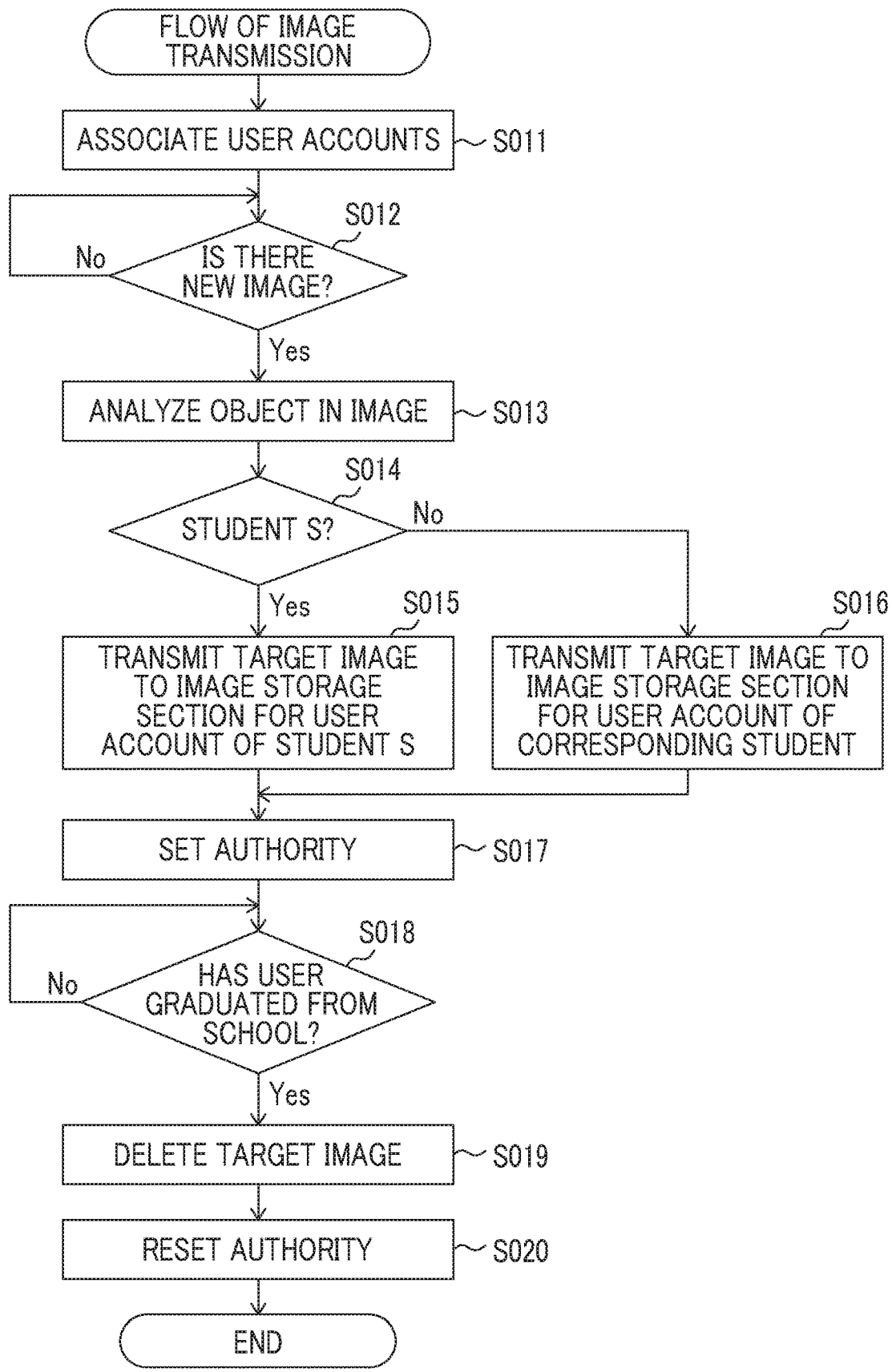
FIG. 10 is a diagram illustrating a flow of image transmission.

Next, the flow of the image transmission illustrated in FIG. 10 will be described as an operation example of the account association unit 27, the analysis unit 28, the image transmission unit 29, the image deletion unit 30, and the authority setting unit 31. FIG. 10 is a diagram illustrating the flow of the image transmission. In the description of the flow of the image transmission described below, a case where the student S who is the service user belongs to the school U which is the service provider will be described as an example.

The flow of the image transmission is started in a case where the student S enters (belongs to) the school U. Specifically, first, the account association unit 27 of the image management device 10 registers, in the service management table TB1, the content that the student S enters the school U, and associates the user account of the student S with the user account of the school U (S011). At this time, the account association unit 27 also registers, in the service management table TB1, the attendance period (that is, the service usage period) of the student S in the school U.

Thereafter, during a period in which the student S is in the school U, in a case where the school U inputs (uploads) a new image under the user account of the school U, the image input reception unit 23 of the image management device 10 receives an image input. As a result, the new image (hereinafter referred to as the image Pn) is stored in the image storage unit 22 for the user account of the school U (Yes in S012).

In a situation where the image Pn is stored in the image storage unit 22 for the user account of the school U, in response to the situation as a trigger, the analysis unit 28 of the image management device 10 sets the image Pn as the target image, and analyzes the object shown in the target image (S013). More specifically, in a case where the analysis unit 28 determines whether a person is shown as the object in the target image and determines that the person is shown, the person determines whether or not the person is the student S with reference to the face matching table TB2 (S014).

Then, in a case where the student S is shown in the image Pn that is the target image (Yes in S014), the image transmission unit 29 of the image management device 10 transmits the image Pn to the image storage unit 22 for the user account of the student S (S015). Further, in accordance with this situation, the authority setting unit 31 of the image management device 10 sets the limited authority for the user account of the student S as the authority for the transmitted image Pn (S017). Thereby, the student S is able to use the image Pn in the user account of the student S thereafter, but the contents thereof are limited to the browsing of the image Pn and the printing order. That is, the student S is inhibited from copying (data copying) the image Pn to the external device including the user terminal 11 of the student S. Therefore, the student S is not able to, for example, print the image Pn by himself or herself. Therefore, in a case where the student S tries to acquire the printed matter of the image Pn, the printing is ordered from the vendor (for example, the photo shooter who provides the image Pn). As a result, it is possible to ensure an opportunity for the student S to utilize the image Pn.

On the other hand, to supplement the description about the authority for the image Pn, the authority setting unit 31 already sets a full permission authority to the user account of the school U, at the time point of inputting the image Pn. Although the full permission authority is set for the user account of the school U with regard to the image Pn, naturally, it is preferable for the school U to give consideration to the student and the parents so as not to violate the portrait right of the student shown in the image Pn. Further, although full permission authority is set, in a case where an image is intended to be transmitted from the user account of the school U to a new user account in the school U, a warning may be issued to the user account of the school U.

Furthermore, at the time point after the image transmission unit 29 transmits the image Pn to the image storage unit 22 for the user account of the student S, the authority of the image Pn for the user account of the school U still remains as the full permission authority.

In addition, the series of steps S012 to S017 are repeated each time a new image (image Pn) is stored in the image storage unit 22 for the user account of the school U while the student S is in the school U.

Thereafter, in a case where the student S graduates from the school U and the service usage period of the school U ends (Yes in S018), the image deletion unit 30 of the image management device 10 receives the image Pn from the image storage unit 22 for the user account of the school U (S019). Thereby, the data usage capacity of the image storage unit 22 for the user account of the school U is reduced by the amount of the image Pn.

In accordance with the deletion of the image Pn, the authority setting unit 31 resets the authority for the image Pn (S020). Specifically, after deletion of the image Pn, the authority setting unit 31 resets the authority of the image Pn for the user account of the student S from limited authority to the full permission authority.

Thereby, the student S (strictly speaking, a person who is the student S) is able to freely utilize the image Pn with the user account of the student S after graduating from the school U. For example, it becomes possible to copy (data copy) the image Pn to the user terminal 11 of the student S.

After deleting the image Pn, the authority setting unit 31 resets the authority of the image Pn for the user account of the school U from the full permission authority to the limited authority. Thereafter, utilization of the image Pn on the school U side is limited. That is, after the student S graduates from the school U, it is possible to prevent the school U from using the image Pn (that is, the image in which the student S is shown) without permission.

In a case where the school U wants to use the image Pn after the authority of the image Pn for the user account of the school U is changed to the limited authority, the school U is able to make a petition and inquire about various ways of utilization of the image Pn through the image management device 10.

In a case where step S020 ends, the flow of the image transmission ends at that time point. Incidentally, in a case where an object shown in the image Pn is not the student S in step S014 (No in S014), for example, the image transmission unit 29 transmits the image Pn to the image storage unit 22 for the user account of the corresponding other student (S016). In such a case, each step of steps S017 to S020 is also performed in the same manner as described above.

As described above, the image management device 10 according to the present embodiment includes the account storage unit 21, the image storage unit 22 for each user account, the account association unit 27, the analysis unit 28, and the image transmission unit 29. In a case where the service user starts using the service provided by the service provider, the account association unit 27 associates the user account of the service user with the user account of the service provider. The analysis unit 28 sets an image stored after association between the user account of the service user and the user account of the service provider as the target image, among the images stored in the image storage unit 22 for the user account of the service provider, and analyzes the object which is shown in the target image. In a case where the object relating to the service user is shown in the target image, the image transmission unit 29 transmits the target image to the image storage unit 22 for the user account of the service user at a preset time point for the image transmission.

According to the image management device 10 configured as described above, the service user is able to utilize the image relating to the service user (for example, an image in which the service user is shown), which is stored under the user account of the service provider, even after the service user uses the service. In this respect, the image management device 10 is superior to the image management device described in JP2013-235335A.

Specifically, in the image management device described in JP2013-235335A, there is a possibility that the image set for sharing may be deleted from the sharing folder under some situations. Further, in the image management device described in JP2013-235335A, in a case where image sharing is set for members of the organization, there is a possibility that a member who withdraws from the organization is unable to browse the shared image. The image, which is deleted or is unable to be browsed, will no longer be available for further browsing and utilization other than browsing.

On the other hand, in the image management device 10 according to the present embodiment, among the images stored under the user account of the service provider, the image relating to the service user is transmitted to the image storage unit 22 for the user account of the service user. Thereby, as the service user finishes using the service, the image relating to the service user may be deleted from the user account of the service provider, or browsing permission of the image stored under the user account of the service provider may be lost. Even in this case, the service user is able to continue to browse and utilize the image relating to the service user. Further, since the image relating to the service user is capable of being utilized continuously, it is possible to create the album AL of the service user by using the image even after the end of use of the service.

In the present embodiment, the image transmitted to the image storage unit 22 for the user account of the service user is deleted from the image storage unit 22 for the user account of the service provider in a case where the predetermined time is reached. Thereby, it is possible to reduce the data usage capacity of the image storage unit 22 for the user account of the service provider.

In the present embodiment, the authority, which is set for the service user relating to the image transmitted to the image storage unit 22 for the user account of the service user, is set as the limited authority during a certain period. Specifically, while the browsing and the printing order of the image can be performed, copying of the image to the external device is limited. As described above, in a case where the handling of the image is limited for a certain period, the service user is able to ensure an opportunity for the service user to utilizes the image while ensuring the profit of the vendor (for example, an image printing vendor) who does business using the image.

By the way, the image management method of the present invention is adopted in the above-mentioned flow of the album creation and flow of the image transmission. In other words, the image management method of the present invention can be implemented by a program (specifically, an image management program) for causing a computer to execute each step in the flow of the album creation and the flow of the image transmission.

It is also possible to provide a readable recording medium to a computer having an image management program recorded thereon. Examples of the recording medium include: magnetic disks such as flexible disks; optical discs such as a compact disc read only memory (CD-ROM), a digital versatile disc (DVD), and a Blu-ray Disc (registered trademark); magnetic optical disks such as a magneto-optical disk (MO); and removable media other than those. It should be noted that the image management program is stored in advance in the storage device constituted by, for example, a magnetic disk, an optical disc, or a magnetic optical disk, and the image storage program may be provided (downloaded) to the computer from the storage device through a communication line.

Modification Example of Flow of Image Transmission

Figure 11:
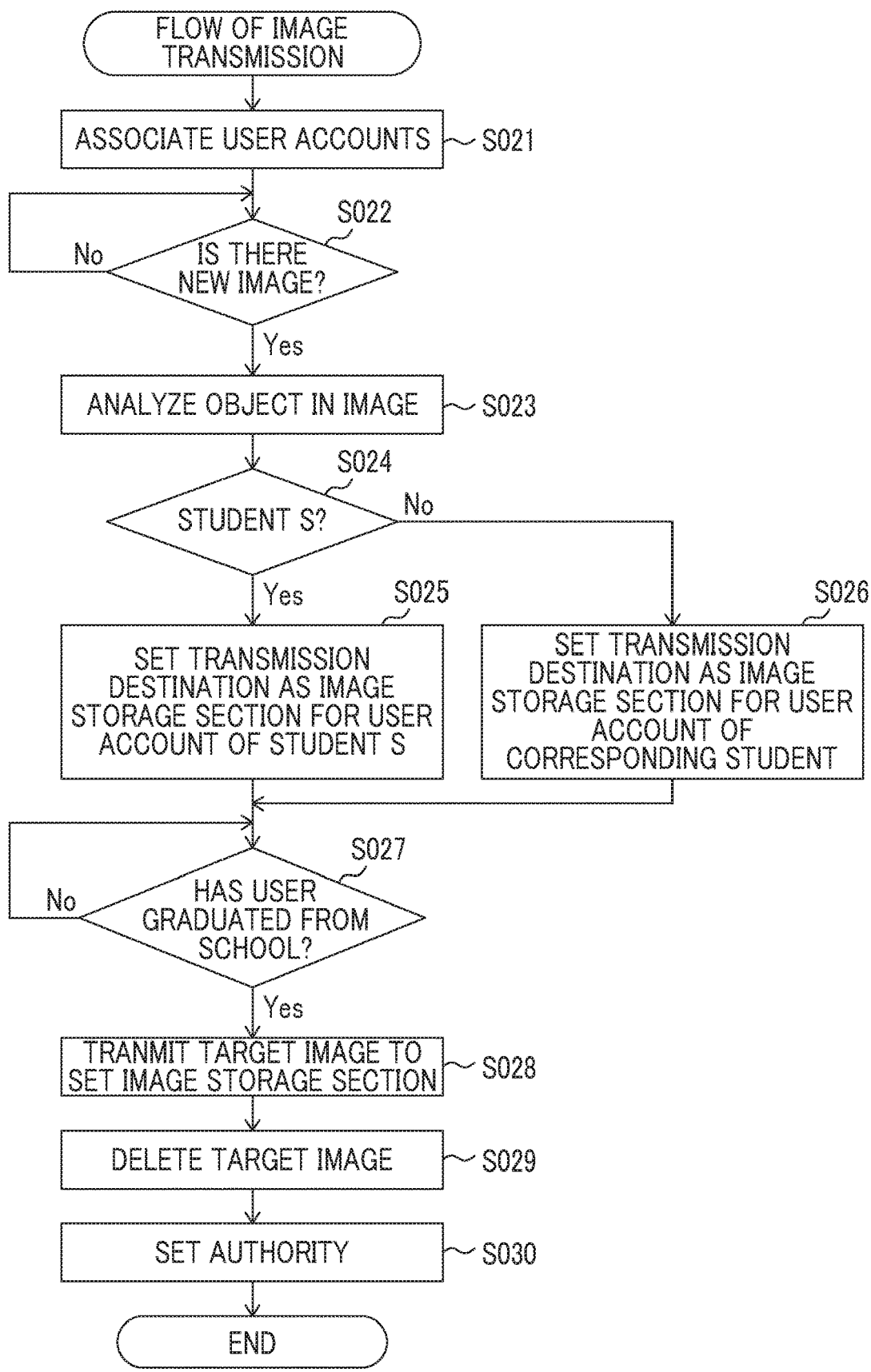
FIG. 11 is a diagram illustrating a flow of image transmission according to a modification example.

In the above-mentioned flow of the image transmission, in a case where the image in which the student S is shown is newly stored in the image storage unit 22 for the user account of the school U while the student S is in the school U, the image is transmitted to the image storage unit 22 for the user account of the student S at the time point. However, the present invention is not limited to this, and, for example, it is possible to consider the modification example of the timing of image transmission illustrated in FIG. 11. Hereinafter, the flow of the image transmission according to the modification example will be described with reference to FIG. 11. FIG. 11 is a diagram illustrating the flow of the image transmission according to the modification example.

It should be noted that, in the modification example, a case where the student S as the service user belongs to the school U as the service provider will be described as an example.

In the flow of the image transmission according to the modification example, the user account of the student S is associated with the user account of the school U (S021). The input and storage of a new image (image Pn) (S022) and the analysis of the object in the image Pn (S023) are the same as those in the flow of the image transmission described above (the flow of the image transmission shown in FIG. 10).

In the flow of the image transmission according to the modification example, in a case where the object shown in the image Pn is the student S (S024), the destination of the image Pn is set as the image storage unit 22 for the user account of the student S (S025). However, at this time point, the image Pn is not yet transmitted.

Thereafter, in a case where the student S graduates from the school U and the service usage period of the school U ends (Yes in S027), the image transmission unit 29 transmits the image Pn to the image storage unit 22 for the user account of the student S at that time point (S028). As described above, in the modification example, the time point for image transmission is set after graduation of the student S (that is, after the service user finishes using the service).

In the modification example, the image deletion unit 30 deletes the image Pn from the image storage unit 22 for the user account of the school U in response to the transmission of the image Pn (S029). Thereafter, the authority setting unit 31 sets the authority for the image Pn (S030). Specifically, the authority setting unit 31 sets the authority of the image Pn for the user account of the student S to the full permission authority, and changes the authority of the image Pn for the user account of the school U from the full permission authority to the limited authority.

In a case where step S030 ends, the flow of the image transmission according to the modification example ends at that time point. Incidentally, in a case where the object shown in the image Pn is not the student S in step S024 (No in S024), for example, the image storage unit 22 for the user account of the corresponding other student is set as the destination of the image Pn (S026). In such a case, each step of steps S027 to S030 is also performed in the same manner as described above.

EXPLANATION OF REFERENCES

10: image management device
11: user terminal
12: database
21: account storage unit
22: image storage unit
23: image input reception unit
24: album creation unit
25: evaluation value calculation unit
26: album update unit
27: account association unit
28: analysis unit
29: image transmission unit
30: image deletion unit
31: authority setting unit
AL: album
Pa1, Pa2, Pa3, Pa4, Pa5: image
Ps1, Ps2: image
Pu1, Pu2, Pu3, Pu4, Pu5: image
TB1: service management table
TB2: face matching table
TB3: authorization management table
N: network

What is claimed is:

1. An image management device comprising:
an account storage unit that stores user accounts including a user account of a service user and a user account of a service provider;
an image storage unit that is provided for each of the user accounts; and
a processor configured to:
associate the user account of the service user with the user account of the service provider in a case where the service user starts using a service provided by the service provider;
set a target image from images which are stored in the image storage unit for the user account of the service provider after the user account of the service user is associated with the user account of the service provider, and analyze an object shown in the target image;
transmit the target image to the image storage unit for the user account of the service user at a preset time point for image transmission in a case where the object relating to the service user is shown in the target image; and
set an authority for handling images for each user account,
wherein the processor is further configured to set an authority of the target image transmitted to the image storage unit for the user account of the service user to a limited authority for permitting reading and inhibiting copying to an external device, and
wherein the processor is further configured to set the authority of the target image transmitted to the image storage unit for the user account of the service user to a full permission authority for fully permitting handling including copying to an external device and reading in a case where the service user finishes using the service and the target image transmitted to the image storage unit for the user account of the service user is deleted from the image storage unit for the user account of the service provider.

2. The image management device according to claim 1, wherein the time point for image transmission is set after the service user finishes using the service.

3. The image management device according to claim 1, wherein in a case where a new image is stored in the image storage unit for the user account of the service provider, the processor is further configured to analyze an object shown in the target image by using the new image as the target image, and
wherein in a case where the object relating to the service user is shown in the new image as the target image, the processor is further configured to transmit the new image to the image storage unit for the user account of the service user.

4. The image management device according to claim 1, wherein among the images stored in the image storage unit for the user account of the service provider, the target image is an image stored after an individual who is the service user belongs to a group which is the service provider in order to use the service.

5. The image management device according to claim 1, wherein in a case where the object shown in the target image is the service user, the processor is further configured to transmit the target image to the image storage unit for the user account of the service user at the time point for the image transmission.

6. The image management device according to claim 1, wherein the processor is further configured to set a full permission authority for fully permitting handling including copying to an external device and reading, as the authority for the image stored in the image storage unit for the user account of the service provider, for the user account of the service provider, and
wherein the authority of the target image for the user account of the service provider remains as the full permission authority at a time point after the processor transmits the target image to the image storage unit for the user account of the service user.

7. The image management device according to claim 1, wherein in a case where the processor deletes the target image from the image storage unit for the user account of the service provider, the processor is further configured to reset the authority of the target image for the user account of the service provider, to the limited authority from the full permission authority.

8. The image management device according to claim 1, wherein the processor is further configured to create an album unique to an individual user by using an image stored in the image storage unit for the user account of the individual user.

9. The image management device according to claim 8, wherein the processor creates the album by using an image in which the individual user is shown among the images stored in the image storage unit for the user account of the individual user.

10. The image management device according to claim 8, wherein the processor creates the album by using an image in which the individual user and a participant of an event relating to the individual user are shown among the images stored in the image storage unit for the user account of the individual user.

11. The image management device according to claim 8, wherein the processor is further configured to calculate an evaluation value for an image used to create the album,
wherein in a case of calculating the evaluation value, the processor adds points in accordance with an object shown in the image used to create the album.

12. An image management method comprising:
associating a user account of a service user with a user account of a service provider in a case where the service user starts using a service provided by the service provider;
setting, a target image from images which are stored for the user account of the service provider after the user account of the service user is associated with the user account of the service provider, and analyzing an object shown in the target image;
transmitting the target image for the user account of the service user at a preset time point for image transmission in a case where the object relating to the service user is shown in the target image;
setting an authority for handling images for each user account;
setting an authority of the target image for the user account of the service user to a limited authority for permitting reading and inhibiting copying to an external device; and
setting the authority of the target image for the user account of the service user to a full permission authority for fully permitting handling including copying to an external device and reading in a case where the service user finishes using the service and the target image for the user account of the service user is deleted for the user account of the service provider.

13. The image management method according to claim 12, further comprising creating an album unique to an individual user by using an image stored for the user account of the individual user.

14. A non-transitory computer readable recording medium storing a program for causing a computer to execute the image management method according to claim 12.

15. A image management device comprising:
a storage device that stores user accounts including a user account of a service user and a user account of a service provider, and an image which is provided for each of the user accounts;
a processor configured to:
associate the user account of the service user with the user account of the service provider in a case where the service user starts using a service provided by the service provider,
set a target image from images which are stored in the storage device for the user account of the service provider after the user account of the service user is associated with the user account of the service provider,
transmit the target image as the image for the user account of the service user at a preset time point for image transmission in a case where the object relating to the service user is shown in the target image by analyzing an object shown in the target image, and
set an authority for handling images for each user account,
wherein the processor is further configured to set an authority of the target image transmitted to the storage device for the user account of the service user to a limited authority for permitting reading and inhibiting copying to an external device, and
wherein the processor is further configured to set the authority of the target image transmitted to the storage device for the user account of the service user to a full permission authority for fully permitting handling including copying to an external device and reading in a case where the service user finishes using the service and the target image transmitted to the storage device for the user account of the service user is deleted from the storage device for the user account of the service provider.

* * * * *